United States Patent [19]
Funaki

[11] Patent Number: 5,895,135
[45] Date of Patent: Apr. 20, 1999

[54] PHOTOGRAPHIC CAMERA

[75] Inventor: Akihiko Funaki, Omiya, Japan

[73] Assignees: Fuji Photo Film Co., Ltd., Kanagawa; Fuji Photo Optical Co., Ltd., Saitama, both of Japan

[21] Appl. No.: 08/878,777

[22] Filed: Jun. 19, 1997

[30]  Foreign Application Priority Data

Jun. 19, 1996  [JP]  Japan ................................ 8-158501

[51] Int. Cl.$^6$ ............................ G03B 1/00; G03B 17/24

[52] U.S. Cl. ............................................ 396/319; 396/390

[58] Field of Search ................................ 396/390, 319, 396/210

[56]  References Cited

U.S. PATENT DOCUMENTS

| | | | |
|---|---|---|---|
| 5,598,236 | 1/1997 | Ueda et al. | 396/319 |
| 5,614,969 | 3/1997 | Izukawa | 396/319 |
| 5,724,621 | 3/1998 | Serita et al. | 396/319 X |

*Primary Examiner*—W.B. Perkey
*Attorney, Agent, or Firm*—Sughrue, Mion, Zinn, Macpeak & Seas, PLLC

[57] ABSTRACT

A camera detects at least two magnetic tracks accompanying film frames which do not have information recorded thereon. The camera transports the film to place the foremost film frame accompanied with the unrecorded magnetic tracks to a specific position in the camera to avoid double exposure of an exposed film frame accompanied with an unrecorded magnetic track.

7 Claims, 10 Drawing Sheets

(a)

(b)

PHOTOGRAPHIC CAMERA

BACKGROUND OF THE INVENTION

1. Field of the Invention

The invention relates to a photographic camera, and, in particular, to a photographic camera which is capable of intentionally rewinding a partly exposed film into a film cartridge and properly setting an unexposed frame of the film in the film cartridge.

2. Brief Description of Related Art

In recent years, a new type of photographic film has been proposed, which has a row of exposure frames accompanied with magnetic recording areas, respectively, and a film cartridge for accommodating the new type of film as shown in Japan Unexamined Patent Publication No. 3-75741. Cameras for use with the film cartridge have been developed which have created a new photographic system with worldwide standards. Some such cameras capable of magnetically recording information on exposure conditions on a magnetic recording area of each frame of the film at every exposure. Therefore, it is possible to recognize how many frames have already been exposed by reading the information on the magnetic recording areas, which makes it further possible to set the foremost unexposed frame of the film partly exposed to the camera exposure aperture (i.e., to use all of the unexposed frames of the reloaded film). However, it may happen that, for one of the exposed frames, magnetic recording is not made at exposure on the related frame or that proper reading of the information on the magnetic recording area is not accomplished. This will cause double exposure if the exposed frame of the reloaded film is placed at the camera exposure aperture.

SUMMARY OF THE INVENTION

An object of the invention is to provide a photographic camera which prevents double exposure of even a partly-exposed film reloaded in the camera.

The foregoing object of the invention is accomplished by providing a photographic camera which is capable of loading film, even partly exposed film, of the type having a magnetic recording area accompanying each exposure frame. The photographic camera detects the number of film frames accompanied with unrecorded magnetic recording areas, examines a continuance of at least two unrecorded magnetic recording areas accompanying the exposed film frames, and causes a film transportation mechanism to transport the film until the foremost one of the unexposed film frames accompanied with unrecorded magnetic recording areas into a predetermined position, such as the camera exposure aperture.

According to another aspect of the invention, the photographic camera detects a number of exposed film frames of which the magnetic recording areas are unrecorded with magnetic information on the exposed film frames, examines coincidence of the number of the unexposed film frames stored in a memory with the number of the frames accompanied with the unrecorded magnetic areas, and causes the film transportation mechanism to transport the film by a length according to the number of the unexposed frames when there is a coincidence between the number of the unexposed film frames and the number of the frames accompanied with the unrecorded magnetic areas.

According to a further aspect, the photographic camera further examines a continuance of at least two unrecorded magnetic recording areas of film frames when coincidence is not detected and transports the film until the foremost one of the frames whose unrecorded magnetic recording areas are continual is placed in a predetermined position, for example the exposure frame, of the camera.

According to a further aspect of the invention, the photographic camera interrupts transportation of the film when it detects that the film is partly exposed and that the magnetic recording area of the foremost film frame is unrecorded.

With the photographic camera of the invention, in cases where the camera is loaded with a film cartridge in which the film is partly exposed, even if the camera does not read information of a magnetic recording area of an exposed film frame the magnetic recording area of an exposed film frame is not unrecorded with information on the exposed film frame, the exposed film frame is prevented from double exposure. Also double exposure is never encountered by any exposed film frame even when selection of the number of exposed film frames from the memory is not available. Further, because the camera transports the film according to the number of unexposed film frames or the number of the frames accompanied with the unrecorded magnetic areas when there is coincidence between the number of the unexposed film frames stored in a memory with the number of the frames accompanied with the unrecorded magnetic areas, the foremost unexposed film frame is quickly and reliably transported to the predetermined position.

DETAILED DESCRIPTION OF THE INVENTION

Figure 1:
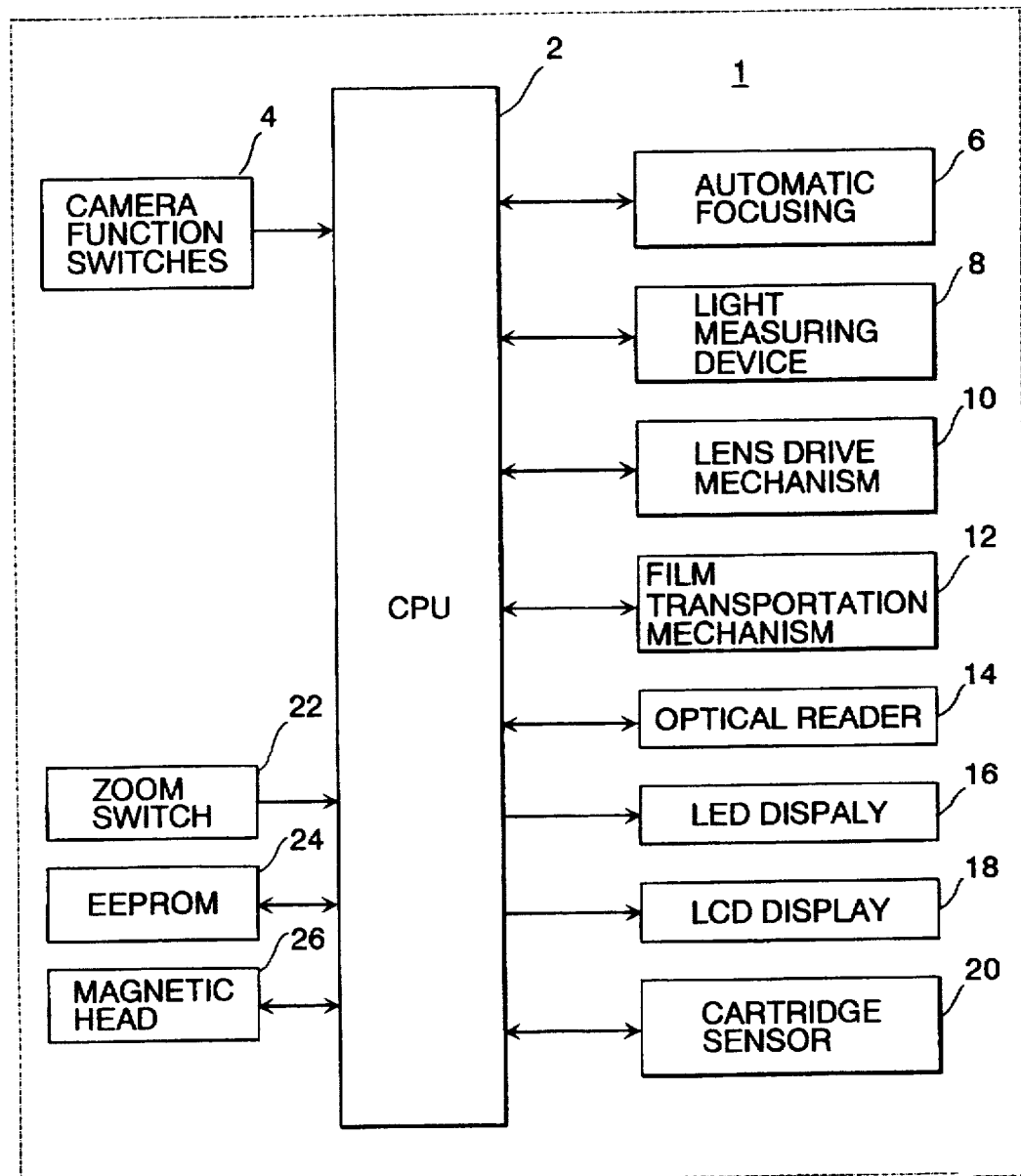
FIG. 1 is a schematic block diagram of an electronic control system for a camera according to an embodiment of the invention.

Referring to the drawings in detail, and in particular to FIG. 1, a photographic camera 1 includes a CPU 2 having a micro-computer which governs and controls most functions of the camera. One of the functions controlled by the CPU 2 is the transporting of film loaded in the camera which is done by a film transportation mechanism 12. The film transportation mechanism 12 includes a power train such as a gear train driven by an electric motor (not shown) for rotating a spool 62 of a film cartridge 60 shown in FIG. 2 in a direction of unwinding a film 63 out of the film cartridge 60 and in a direction of rewinding the film 63 into the film cartridge 60.

Figure 2A:
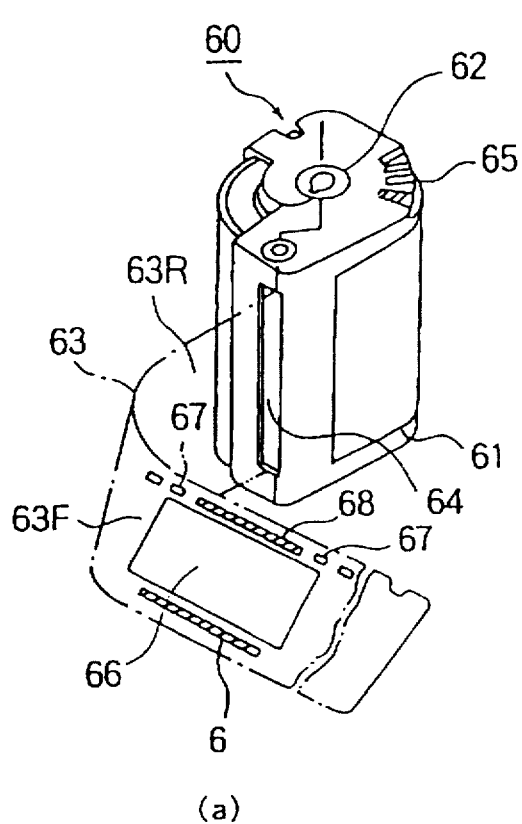
FIGS. 2A and 2B are schematic illustrations of a film cartridge used in the camera of the invention.
Figure 2B:
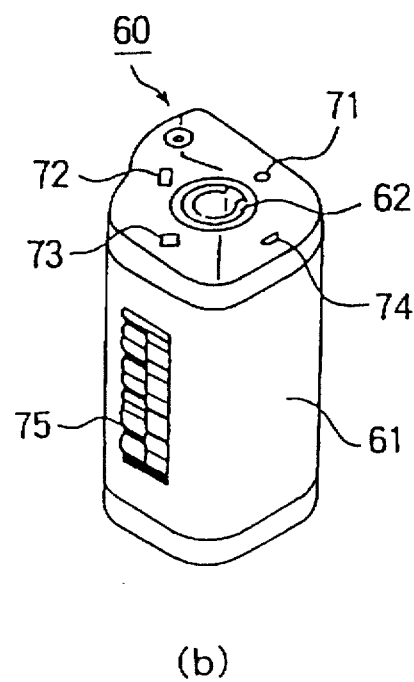

As shown in FIGS. 2A and 2B, the cartridge spool 62 is installed for rotation in the film cartridge 60 having a light-tight structure, and the film 63 is wound around and unwound off from the cartridge spool 62. The film cartridge 60 has a light block door 64 which is rotated closed to prevent ambient light from entering into the interior of the film cartridge 61 and rotated open to permit the film 63 to move into and out of the interior of the film cartridge 60. Data disk 65 with radial bar codes thereon is coaxially installed to one of opposite ends of the film cartridge 60 and rotates together with the spool 62. The bar codes give information on the film 63 such as the type of film, a film speed and the number of available exposure film frames 66. The other end of the cartridge 60 is provided with a plurality of windows (cut-outs), such as a circle-shaped window 71, a semicircle-shaped window 74, a cross-shaped window 73 and a rectangle-shaped window 72, which give visual indications on exposed conditions of the film 63 in the film cartridge 60, which is called a visual exposure index (VEI) system. This is accomplished by means of a contrasting white flag (not shown) rotatable together with the cartridge spool 62, which is seen through one of the windows depending on the parked position of the spool 62. For example, the circle provides an indication that the film in the film cartridge 60 is unexposed or fresh, the semi-circle provides an indication that the film 63 in the film cartridge 60 is partly exposed but has not yet been processed, the cross provides an indication that the film 63 in the film cartridge 60 is fully exposed but has not yet been processed, and the rectangle provides an indication that the film 63 in the film cartridge 60 has been processed. This VEI system makes it easy for the photographer to visually recognize the states of the film in the film cartridge 60 before loading or reloading the film cartridge 60 into the camera 1.

As shown in FIG. 2A, the film 63 includes a film base, one side 63F of which is coated with a silver halide photosensitive layer, and the other side 63R of which has a magnetic layer. Each exposure film frame 66 of the film 63 is accompanied with magnetic recording areas 68 on upper and lower sides thereof. Each magnetic recording area 68 is used to record magnetically readable information about exposed conditions such as the type of exposure light, a focal length of the taking lens and so on and/or on a user message such as a title of the picture. Pairs of perforations are formed and located along a margin at one side of the film 63 where the magnetic recording area 68 is provided, each paired perforations defining lengthwise extremities of an exposure film frame 66. The film cartridge 61 has a label thereon on which an identification number (which is hereinafter referred to as an ID No.) and an optical bar code 75 representing the ID No. are printed.

The utilization of the film cartridge 60 endows the camera 1 with not only a novel feature of recording and reproducing magnetic information in addition to the features of the conventional silver halide photographic film, but also a feature that makes it possible to preserve even an exposed film in the film cartridge 60, to indicate the state of a film in the film cartridge 60 by means of the VEI system, to reload the film cartridge 60 with a film partly unexposed.

Referring back to FIG. 1, the CPU 2 controls a magnetic head 26 as a way of writing magnetic information and reading the magnetic information on the magnetic recording area 68 of the film 63 which is located near one end of the camera exposure frame as viewed in the film winding direction.

A nonvolatile memory EEPROM 24 is connected to the CPU 2 for storing information necessarily to govern and control the camera functions. Memories other than nonvolatile memories may be installed. The LCD display 18 is connected to the CPU 2 for displaying information useful for the photographer such as operational modes of the camera and exposure conditions. The CPU 2 is connected with various components of the camera 1, such as operational switches 4, an automatic focusing device 6, a light measuring device 8, a lens barrel driving unit for zooming 10, an optical reader 14 for reading optical information of the data disc 65 of the film cartridge 60, a LED display 16 such as a light emitting diode for indicating the termination of exposure, a film cartridge sensor 20 for detecting the film cartridge 30 in the camera, and a switch for zooming 22.

Figure 3:
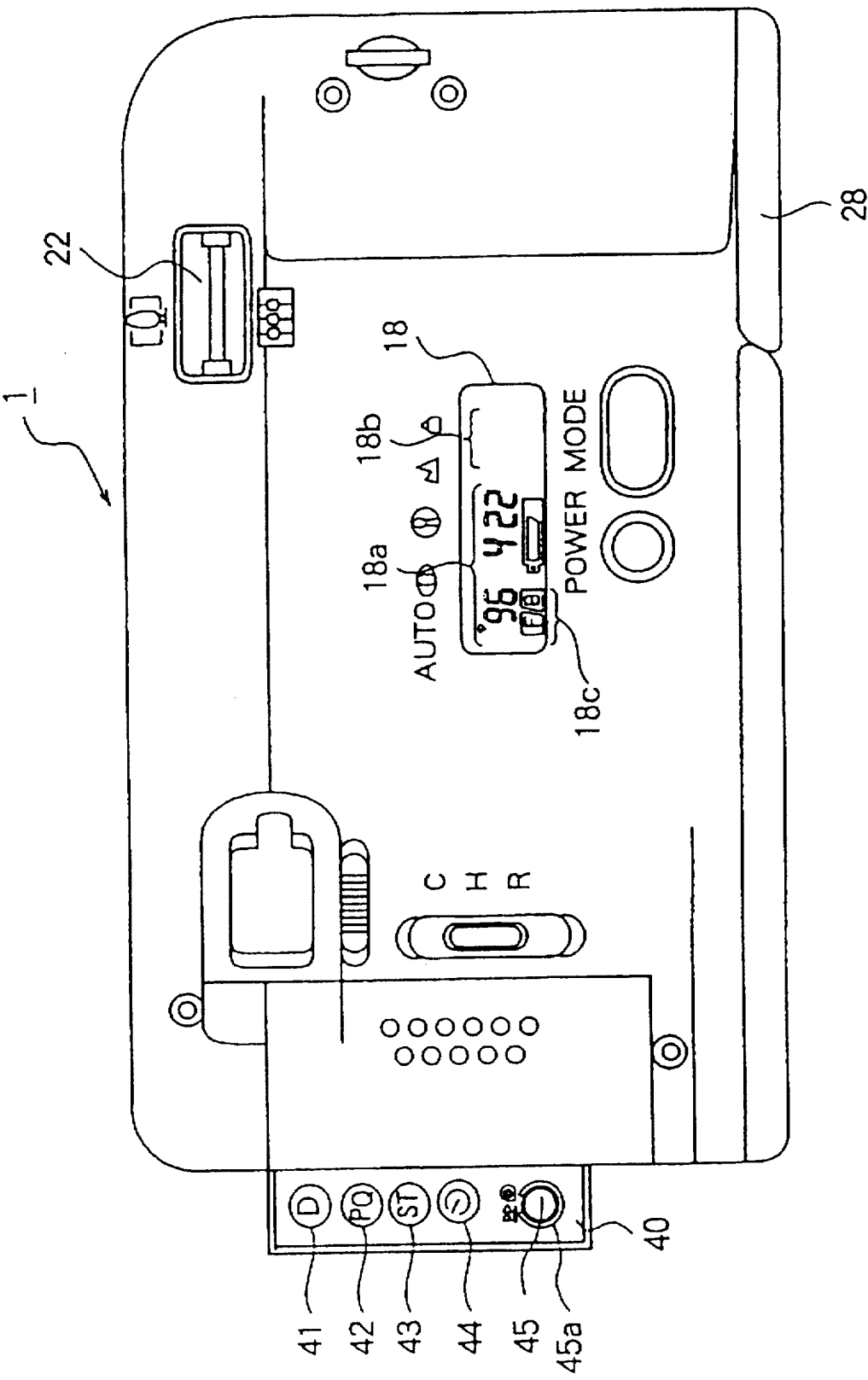
FIG. 3 is a rear view of the camera construction.

FIG. 3 shows the camera construction. A bottom lid 28 is opened to load and unload the film cartridge 60 from a cartridge chamber (not shown) in the camera 1. At the back, the camera 1 includes the LCD display 18 having a display area which is divided into three sections in normal mode, namely, a first display section 18a for date information, a second display section 18b for indicating the number of available film frames of the film in the film cartridge 60, and a third display section 18c for indicating a location on a print where information such as date is to be printed. For example, an indication "F" means the front side of a print and an indication "B" means the back side of a print. The camera 1 at one of its sides is provided with a group of operational switches 4 which can be covered by a switch cover 40. Operational switches 4 include a D switch 41, a PQ switch 42, a ST switch 43, a self-timer switch 44 and a MR switch (rewinding switch) 45. The D switch 41 is for switching the display mode of the LCD display 18, the PQ switch 42 is for setting the number of prints to be made from each frame, the ST switch is for selecting titles to be printed on a print or prints, the self-timer switch 44 is for self-timed exposure, and the MR switch 45 is for rewinding a film midway before a film 63 has not yet been fully exposed. The MR switch 45 is surrounded by a circular projection 45a to avoid accidental depression of the MR switch 45.

Figure 4:
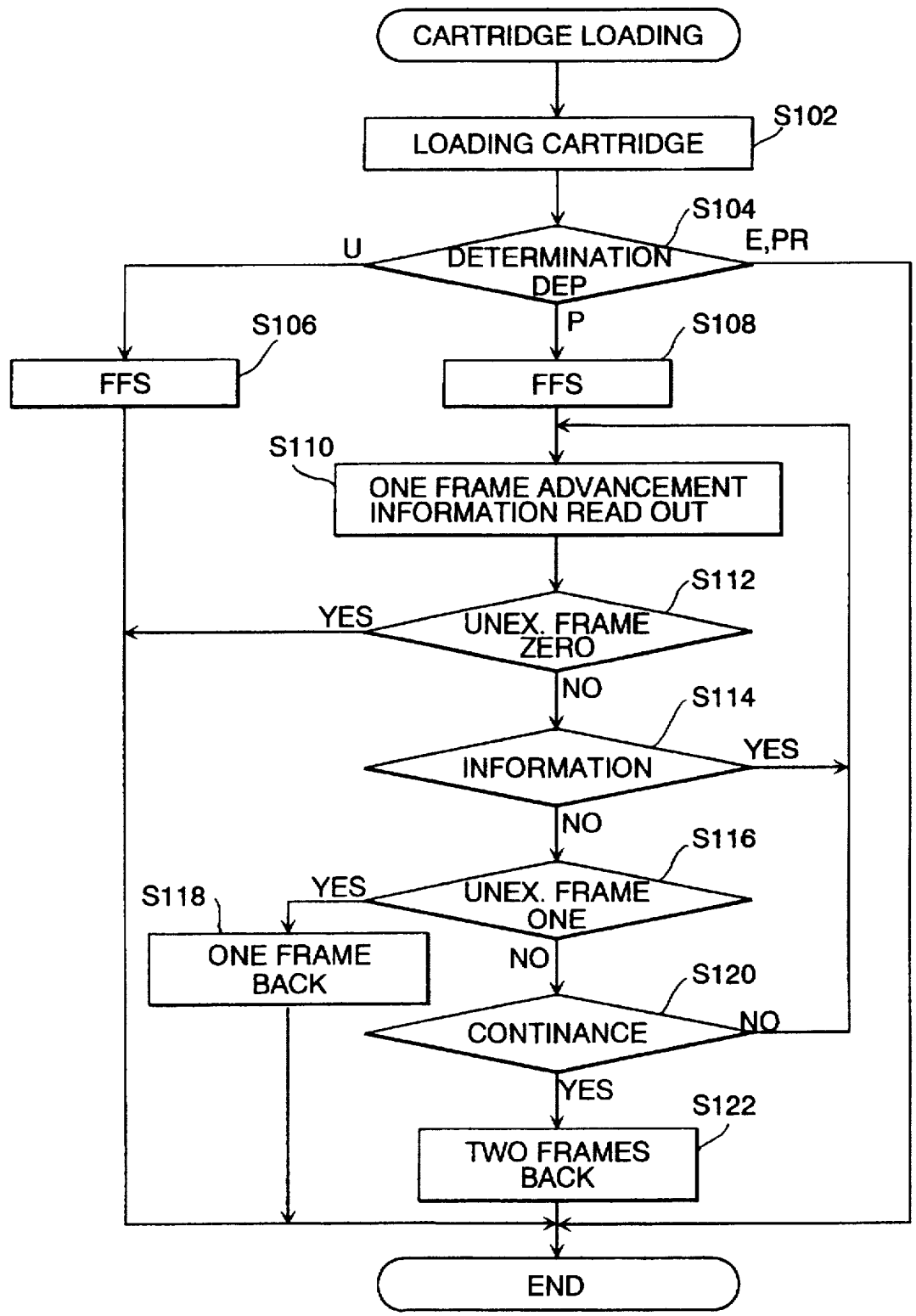
FIG. 4 is a flow chart illustrating a film cartridge loading and film frame setting control sequence routine.

FIG. 4 is a flow chart of the film cartridge loading and film frame setting sequence routine. Upon loading the film cartridge 60 into the camera 1 and closing the bottom lid 28 at step S102, a determination is made at step S104b as to double exposure prevention (DEP) at step S104. In detail, an optical reader 14 reads information of the data disc 65 of the film cartridge 60, and according to the information, an exposed state of the film 63 in the film cartridge 60 is determined. Details with the determination of DEP are described in U.S. Pat. No. 5,541,681. If the DEP determination results in UNEXPOSED (abbreviated by U), which the film in the film cartridge 60 is unexposed or fresh, then, the flow chart logic branches to step S106 where the first film frame is placed at the camera exposure frame (which is hereinafter referred to as FFS for "First Frame Setting") by CPU's controlling the film transporting means. Thus the flow chart logic is terminated. If the DEP determination results in EXPOSED or PROCESSED (abbreviated by E.PR), which means that the film in the cartridge 60 is fully exposed or has been already processed, the film is not advanced at all and immediately the flow chart logic is terminated. Especially in this case it may be preferred that a message advising the user that the film has already been exposed or processed is displayed on the LCD display 18 or otherwise sounded by using synthetic voice technology which is well known in the art. If the DEP determination leads to PARTLY EXPOSED (which is abbreviated by P), which means the film is partly exposed and partly unexposed, then, the film transportation means 12 advances the film 34 to place the first unexposed film frame 66 at the camera exposure frame at step S108.

Subsequently, the magnetic recording area 68 is read frame by frame as the film 63 is advanced frame by frame at step S110. While the film 63 is advanced, the number of unexposed frames of the film which is also displayed in the LCD display 18 is checked at step S112. If the number is 0 (zero), that means there is no available film frame, then, the flow chart logic is terminated. In this case also, the same message as in the case of EXPOSED or PROCESSED above may be preferred.

If the number is other than zero, it is checked whether there is information recorded on the magnetic recording area 68 of the frame at step S114. If there is some information recorded in the area, which means the frame is once exposed, then, the flow chart logic returns back to step S100 and executes the loop from step S110 to step S114 until no information is detected in the magnetic area of a frame while advancing the film, and then passes to step S116.

The number of unexposed film frames, which is displayed on the LCD display 18, is checked at step S116. When the number is one (1), the film is transported backward by one frame by CPU's controlling the film transporting means at step S118 so that the first film frame without any magnetic record information will be set to the camera exposure frame, then, the flow chart logic is ended. On the other hand, if the number is more than 1 (one), a determination is made as to whether there are two frames in series both of which are not accompanied with information in their magnetic recording area 68 at step S120. For example, how many times the determination has been made at step S120 is checked and the count data is stored in EEPROM 24. A count of zero means that the frame under examination is the first detection of a frame with nothing recorded on the magnetic recording area 68. Then, the flow chart logic returns back to step S110. If the count becomes one (1), that means that two frames in series have no magnetically recorded information, then, the flow chart logic proceeds to step S122 where the film is transported backward by two frames by the CPU controlling the film transporting means so that the first image frame without any magnetically recorded information is placed into the camera exposure frame. Thereafter, the flow chart logic is ended.

As described above, in the case of reloading a film cartridge 60 having a film 63 which is intentionally rewound midway before being fully exposed, when it is determined that two frames in series have no magnetically recorded information, then, the first one of the two film frames without any magnetically recorded information is automatically advanced to the camera exposure frame. Consequently, even when the magnetically recorded information of only one film frame is undetected accidentally for some reasons in spite of its actual existence of information, the camera does not consider the frame unexposed unless two frames in series are found to have no magnetically recorded information in their magnetic recording areas. This increases reliability of the camera from using a partly exposed film and avoiding a fatal double exposure, and for starting exposure from the first unexposed frame.

The camera 1 may be modified in that it has a function of entering an ID No. of a film cartridge 60 loaded in the camera which has a film intentionally rewound midway before completion of exposure of the full available film frames.

Figure 5:
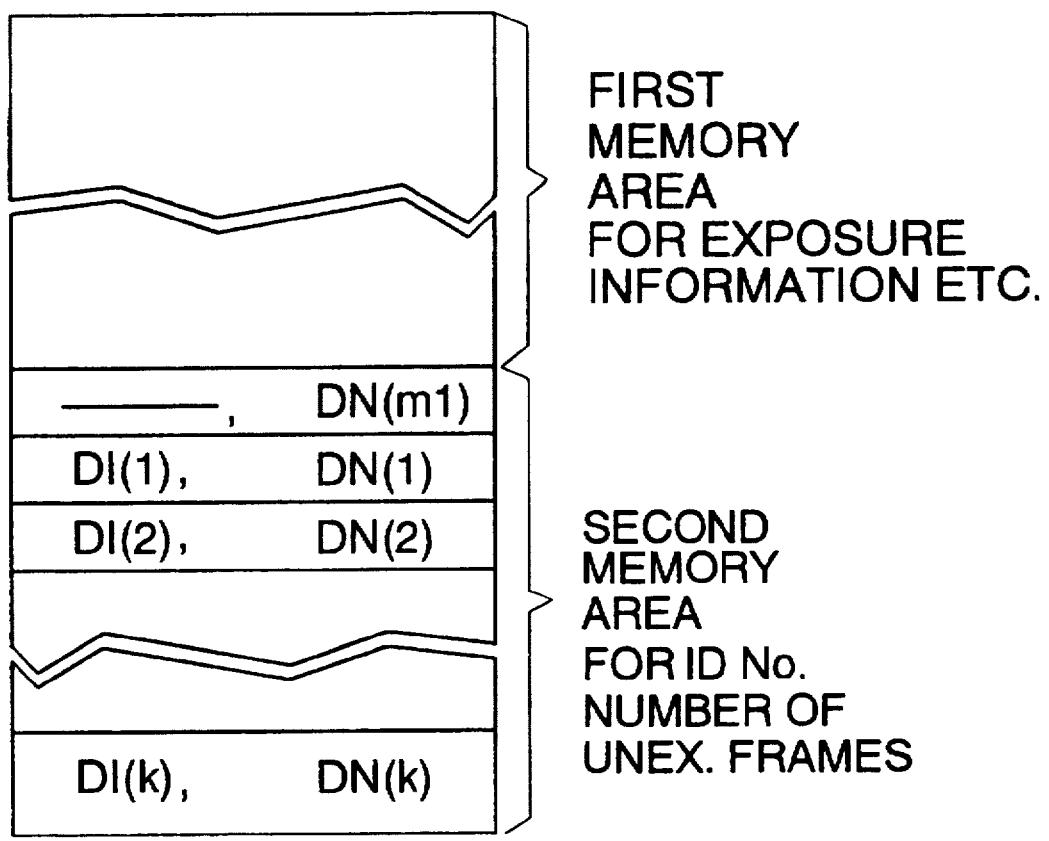
FIG. 5 is an explanatory diagram showing a memory map of an EEPROM in the camera of FIG. 1.

As shown in FIG. 5, the EEPROM 24 used in the camera 1 is divided into two memory areas, namely a first memory area and a second memory area. The first memory area is for storing information regarding exposures such as film speed and data of various flags necessary for operation of the camera. Second memory area is for storing information on the number of unexposed film frame of a film which is intentionally rewound midway into a film cartridge before completion of exposure of all available film frames and the ID number for identifying the film cartridge. Specifically, the second memory area stores information on a plurality of combinations(k) containing of data DI (l)–DI(k) relating to the ID number and data DN (l)–DN(k) relating to the number of unexposed frames of the film when the film is intentionally rewound midway before completion of exposure of the available film frames. The second memory area is capable of storing a plurality of the information, a combination of DI and DN. Memories of the type other than the nonvolatile-type, which is capable of storing information on a plurality of combination of corresponding DI and DN data, may be also available.

Figure 6:
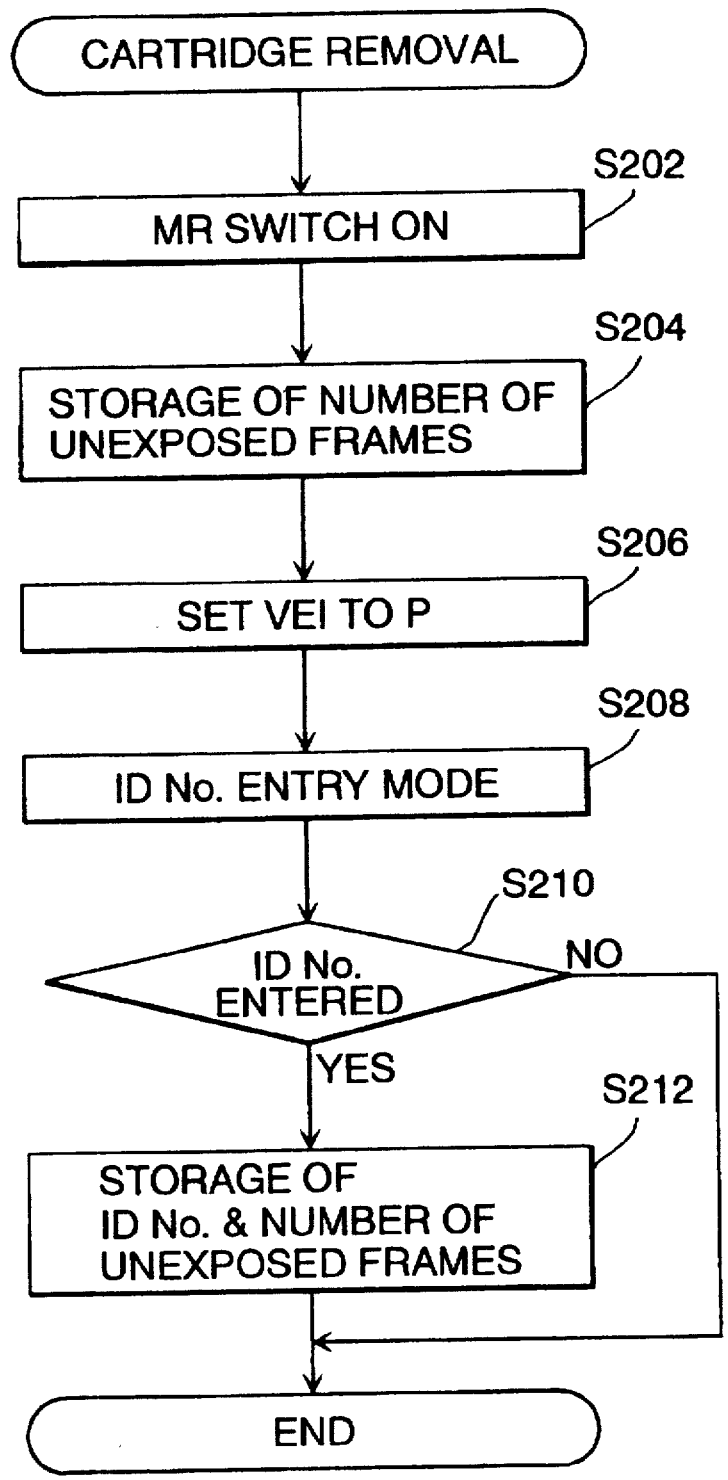
FIG. 6 is a flow chart illustrating a film cartridge unloading sequence routine.

FIG. 6 is a flow chart illustrating the sequence routine of a cartridge removing operation in the case a film cartridge 60 with film partly exposed is intentionally removed from the camera. In cases where the camera is loaded with a film cartridge 60 with film partly exposed, depressing the MR switch 45 causes the film transportation means 12 to operate so as to rewind the film completely into the film cartridge 60 at step S202. Subsequently, the number of unexposed film frames of the film is stored in the EEPROM 24 at step S204 and then, the VEI system is set at the partial position (P) for the semicircle window 74 which, as was previously described, effects an indication of partial exposure of a film at step 206. When the bottom lid 28 is turned open, the camera 1 selects the ID No. entry mode to turn the LCD display 18 from the date display mode, e.g. ['96 4 22 E] to the ID No. entry mode, e.g. [Id–0] at step S208, permitting entry of the ID No. through operation of the switches, D switch 41, PQ switch 42 and ST switch 43.

Figure 7:
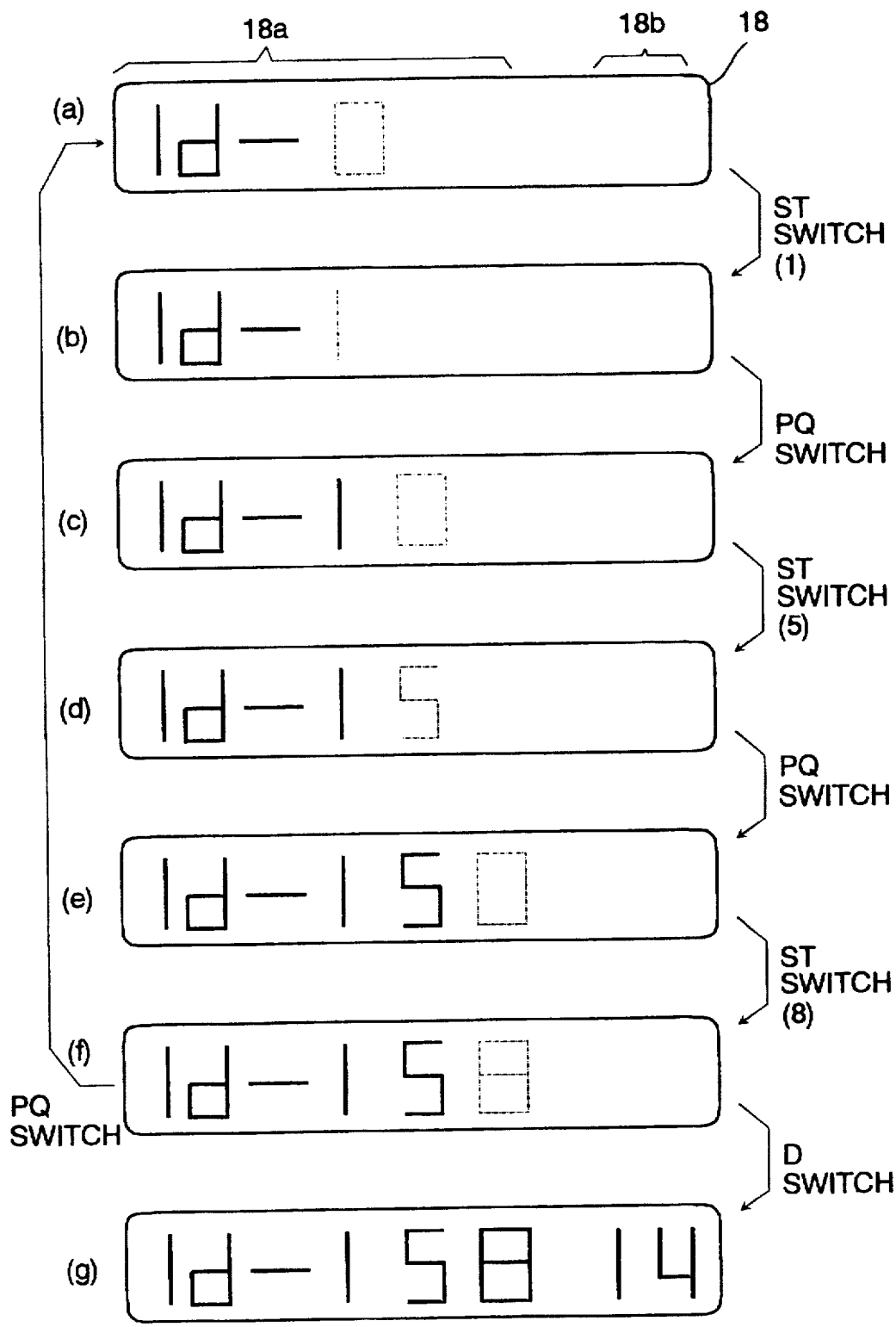
FIG. 7 is an explanatory illustration of an LCD display device for ID number entry sequence.

The following description is directed to ID No. entry procedures with reference to FIG. 7, which shows how the ID number is displayed on the LCD display 18 during ID number entry procedure. The LCD display 18 is in an initial state (a) of ID No. entry. A figure of a three-digit ID number to be displayed is moved one place down from the third figure toward the first figure according to the number of times of depression of the ST switch 43. For example, single depression of the ST switch 43 displays a numeral of "1" blinking as shown in a state (b). Depressing the PQ switch in the state (b) fixes the numeral in the place of the third figure (blinking is terminated), permitting a numeral in the place of the second figure to become ready to be entered as shown in a state (c). Likewise after five times of depression of the ST switch 43, the LCD display 18 displays a numeral of "5" and flashes it on and off, and single depression of the PQ switch 42 makes the numeral "5" in the place of the second figure (blinking is terminated) and fixes it as shown in a state (d). Fixing the second figure numeral permits a numeral in the place of the first figure to become ready to be entered as shown in a state (e). In the same manner, after entry of a numeral "8" in the place of the first figure by depressing the ST switch 43 eight times and the D switch 41 once, the three digit ID No. "158" in this example is displayed and fixed as shown in states (f) and (g). Then, the date display mode appears soon after a lapse of a specified period of time, for example approximately ten seconds. If the PQ switch 42 is depressed before the date display mode appears, the initial state (a) in the ID number entry mode is recovered to permit another entry of the ID number. In the ID No. entry mode, the switches other than the D, PQ and ST switches 41, 42 and 43, such as the shutter release switch and the zoom switch, are prohibited from functioning.

At step S210 in FIG. 6, a determination is made as to whether the ID No. is entered within a predetermined period of time (for example approximately five seconds) or not. If not, the flow chart logic is terminated while the date display mode comes back on the LCD display 18. If entered, after storing data of the entered ID number and the number of unexposed film frames into the EEPROM 24 at step S212, the flow chart logic is terminated.

Figure 8:
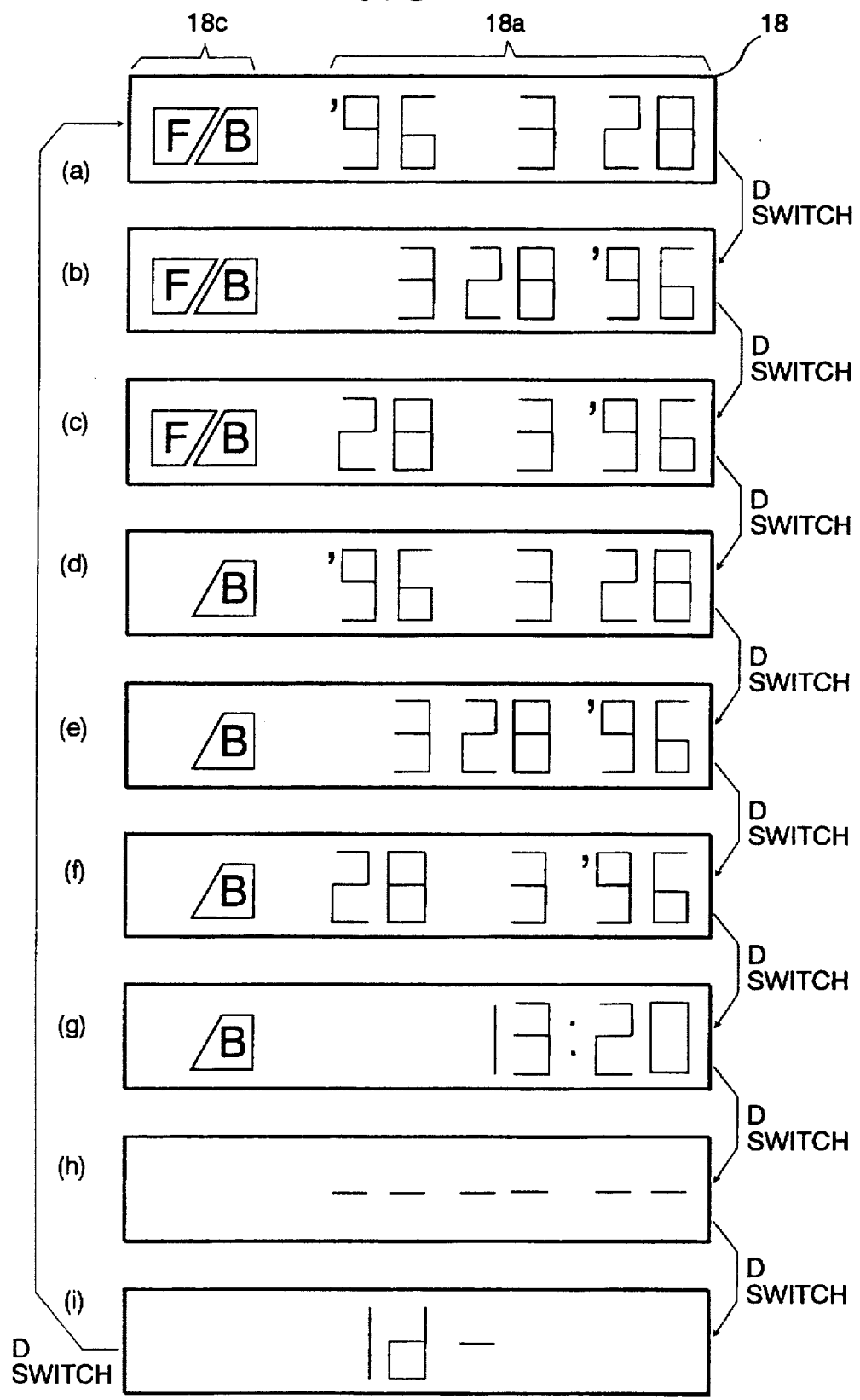
FIGS. 8 and 9 are explanatory illustrations showing an ID number confirmation function of the LCD display device.
Figure 9:
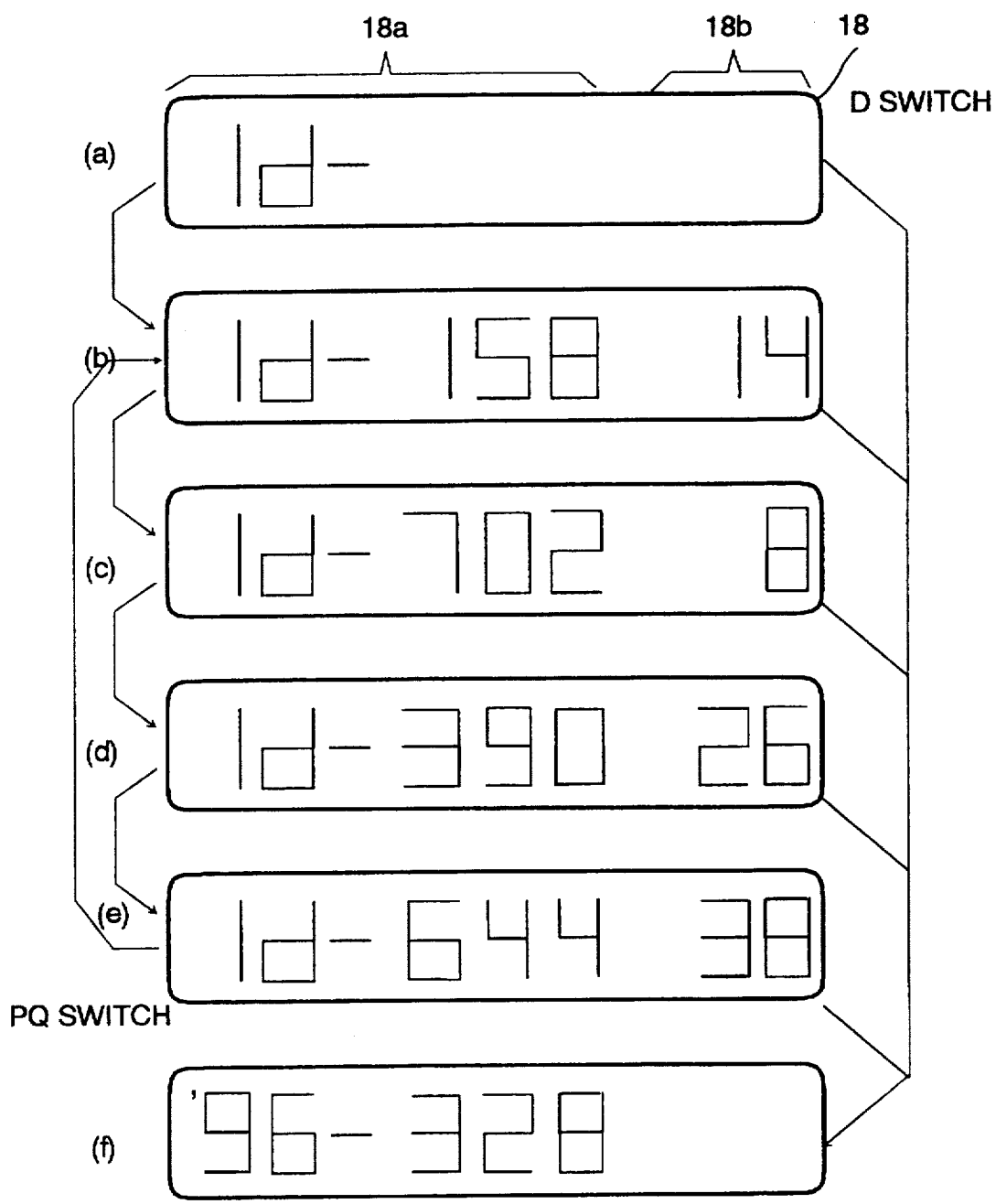

FIGS. 8 and 9 are explanatory illustrations showing confirmation of an ID number entered in the camera on the LCD display 18 which has a display area divided into three display sections, namely a first, a second and a third display section 18a, 18b and 18c. As shown in FIG. 8, the LCD 18 has nine display modes, namely six different date display modes (a)–(f), a time display mode (g), a blank mode (h), and an ID No. entry display mode. In detail, the LCD 18 displays a date in the first display section 18a in order of year, month and day in the first date display mode (a) and in the fourth date display mode (e), a date in the first display section 18a in order of month, day and year in the second date display mode and in the fifth date display mode, and a date in the first display section 18a in order of day, month and year in the third date display mode and in the sixth date display mode. The LCD display 18 displays in the third display section 18c a sign "F, B" which represent the front of a film and the back of the film, respectively, in the first three date display modes (a), (b) and (c) and indicates that the date displayed on LCD display 18 is printed on both sides of a print. On the other hand, the LCD display 18 displays in the third section 18c a sign "B" which represents the back of the film in the second three date display modes (d), (e) and (f) and indicates that the displayed information on the LCD display 18 is printed on the back of a print.

The LCD display 10 displays a time in order of hour and minute in the third display section in the time display mode (g). The time displayed on the LCD display 18 is printed on the back of a print. However, the LCD display 18 displays nothing in the blank mode (h). Further, the LCD display 18 in the ID No. entry mode (I) displays a sign "ID" giving the photographer an indication that the camera 1 is in the ID No. entry mode. Selection of the display modes (a)–(l) of the LCD display 18 is made through the D switch 41. Specifically, the LCD display 18 circularly alters its display mode in order from the side of the first date display mode (a) toward the side of ID No. entry mode (I) whenever the D switch 41 is repeatedly pushed. For example, the LCD display 18, which displays a date in the first date display mode (a) at present, alters its display mode to the second date display mode (b) when the D switch is pushed once, to the third date display mode (c) skipping over the second date display mode (b) when the D switch 41 is pushed twice in succession, to the blank mode (h) skipping over the second to sixth date display modes (b)–(f) and the time display mode (g) when the D switch 41 is pushed seven times in succession. The LCD display 18 set in the blank mode (h) at present alters its display mode to the ID No. entry mode (I) when the D switch 41 is pushed once, and to the second date display mode (b) skipping over the first date display mode (a) when the D switch 41 is pushed three times in succession. In such a manner, the LCD display 18 alters its display mode one by one whenever the D switch 41 is pushed. Accordingly, the LCD display 18 alters its display mode to the ID No. entry mode (I) by pushing the D switch 41 the number of times corresponding to the number of modes between the ID No. entry mode to a display mode selected. Selectable display modes is not necessarily restricted in number and display order to those of the above embodiment shown in FIG. 8.

When PQ switch 42 is depressed after selection of the ID No. entry mode (I), the LCD display 18 alters its display mode to an ID No. display mode in which pairs of the ID No. of a film cartridge and the number of unexposed film frames of the film having been stored and accumulated in the EEPROM 24 in the camera in the previous exposure. Specifically, as shown in FIG. 9, single depression of the PQ switch 42 in the ID No. display mode as shown in a state (a) alters the display to a state (b) of displaying the ID No. of the film cartridge 60 in which the film 63 partly exposed has been intentionally rewound midway and the number of unexposed film frames of the film. Further depressions of the PQ switch 42 make other pairs of the ID Nos. and the numbers of unexposed film frames stored in the EEPROM 24 appear sequentially in order of exposure. The reverse order may be also available. In the ID No. display mode shown in FIG. 9, if the MR switch 45 is depressed, the data of information now displayed is erased, and if the D switch 41 is depressed when the ID No. display mode or if none of the switches is depressed for a predetermined period of time, for example approximately five minutes, the LCD display 18 is altered back to the date display mode (f) as shown in FIG. 9.

Figure 10:
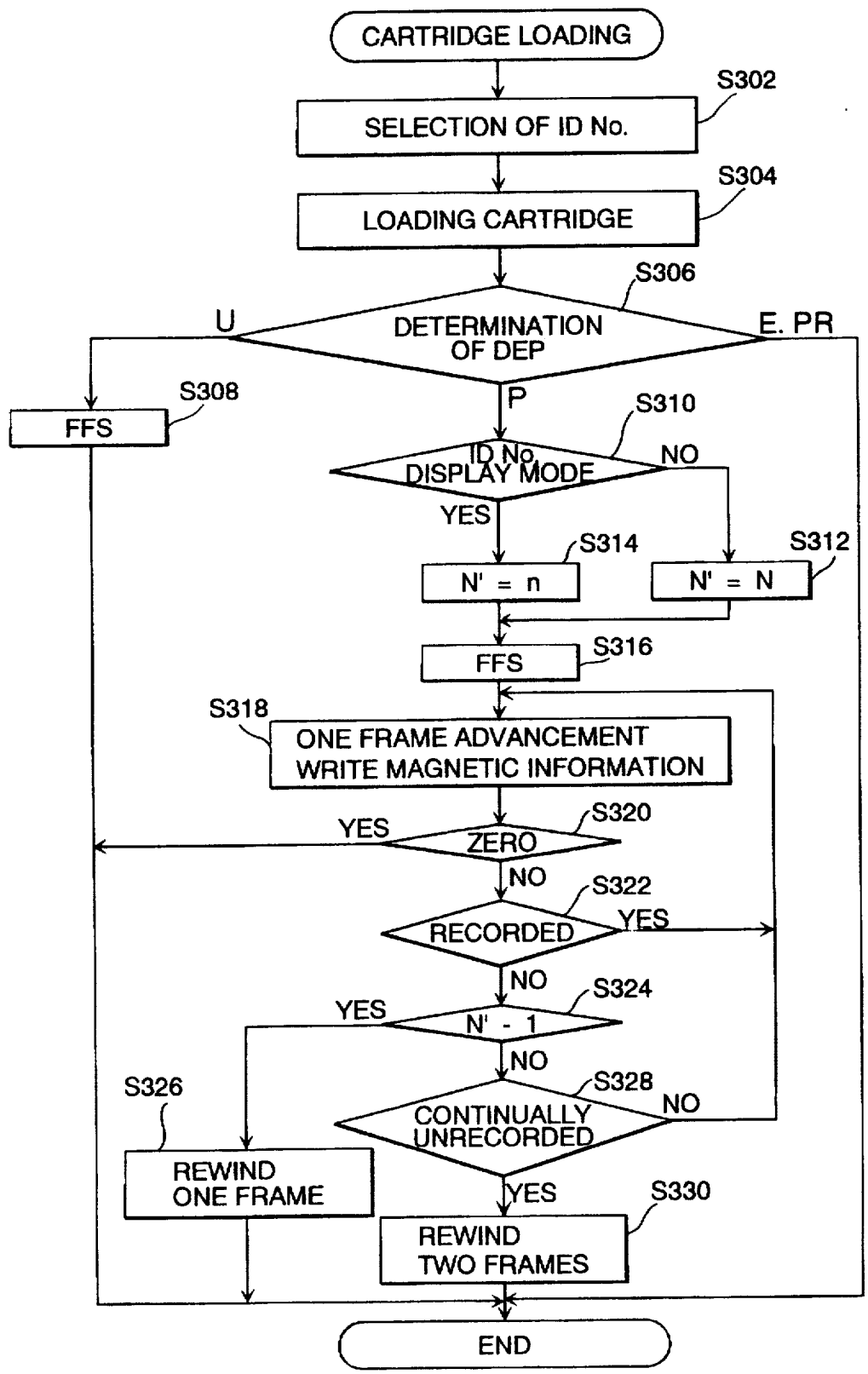
FIG. 10 is a program flow chart for film cartridge loading (and film frame setting) process in the second embodiment of the invention.

FIG. 10 is a flow chart illustrating the film cartridge loading sequence routine. At step S302, a specific ID No. is chosen which identifies a film cartridge 60 to be loaded before into the camera 1. Specifically, as was previously described, the film cartridge 60 is loaded into the camera 1 and the ID No. display mode is altered to display information on ID Nos., including the ID No. of the film cartridge 60 to be loaded, in order on the LCD display 18 as shown in FIG. 9. At step 304, in the ID No. display mode in which a specific ID No. of the film cartridge 60 and the number of unexposed film frames are displayed, the film cartridge 60 is loaded in the camera 1. If the specific ID No. which identifies the film cartridge 60 to be loaded is not found at step S302, the film cartridge 60 may be loaded after the date display mode is set as described above. As above, the reason why the magnetic recording area accompanying the first film frame is unrecorded when the first film frame has been is that at the previous exposure the magnetic recording area is unrecorded due to failures of the magnetic reader, or otherwise that the film is used in a camera having no magnetic recording device at the last exposure. It is preferable to display and blink an error message or sign on LCD 18 to give an attention to the photographer at completion of loading a film cartridge.

Subsequently to loading the film cartridge 60 into the camera 1 and closing the bottom lid 28 at step S304, a DEP determination is executed at step S306, i.e. the optical reader 14 reads information of the data disc 65 of the film cartridge 60. According to the information read in, an exposed state of the film in the cartridge 60 is determined. If the DEP determination results is UNEXPOSED, which indicates that all of the available film frames of the film in the film cartridge 60 are unexposed, the flow chart logic branches to step S308 where the "First Frame Set" operation is made by the CPU controlled film transportation 12. Then, the flow chart logic is terminated. If the DEP determination results in EXPOSED or PROCESSED, which indicates that all of the available film frames of the film in the film cartridge 60 are exposed or already processed, the film is not advanced at all and immediately the flow chart logic is terminated. Especially in this case it may be preferred that the message advising the user that all of the frames of the loaded film have already been exposed or processed, is displayed on the LCD display 18 or is sounded by using well known synthetic voice technology. If the DEP determination leads to PARTIALLY EXPOSED (this is normally expected when the ID No. same as the one of the film cartridge to be loaded in the camera is found and selected before loading the film cartridge) which indicates that some frames of the film are exposed but the rest is unexposed, the flow chart logic proceeds to step S310.

At step S310, a determination is made as to whether or not the ID No. display mode is executed when the film cartridge 60 is loaded. If not, the flow chart logic proceeds to step S312 and a number N which represents the number of available frames of a fresh film the film cartridge 60 originally has is set as a number of frames N' which are to be transported in the following steps during execution of the sequence routine. If the ID No. display mode is executed, the flow chart logic proceeds to step S314 and a number n which is shown in the LCD display 18 as a number of unexposed frames is set as a number of frames N' which are to be transported in the following steps. In both cases FFS procedure is executed at subsequent step S316.

Subsequently, at step S310, the film is transported and magnetic tracks in the magnetic recording area of the film are read frame by frame at step S318. A determination is made at step S320 as to whether the number of unexposed frames of the film displayed on the LCD display 18 is 0 (zero) or not. If zero, the flow chart logic is terminated, or if not, it proceeds to step S322. A determination is further made at step S322 as to whether there is the information recorded on the magnetic track at exposure of a film frame according to the result obtained from the determination made at step S318. If the information is detected, the flow chart logic returns back to step S318 and steps S318, S320 and S322 are repeatedly executed until it is detected that the frame does not have information recorded. If it is found that some frames have no information, then, the flow chart logic proceeds to step S324. A determination is made at step S324 as to whether or not the number of unexposed frames of the film displayed on the LCD display 18 at the moment is N'−1 at step S324. If the number is equal to N'−1, the flow chart logic branches to step S326 where the film is transported by one frame in an opposite direction by the film transportation means 12 to place the first unexposed frame into the camera exposure aperture, then, the flow chart logic is terminated. On the other hand, if the number is not equal to N'−1, the flow chart logic proceeds to step S328.

At step 328, a determination is made as to whether or not the magnetic recording areas of two frames in series are unrecorded at exposure. The determination is made by counting the number of times the flow chart logic is shifted to step S328 and storing it in EEPROM memory 24. If the count is zero, that indicates that the frame under examination is the first unrecorded frame of the film, in other words, two frames unrecorded in series have not been detected, then, the flow chart logic returns back to step S318 and steps S318, S320, S322, S324 and S328 are executed again. If the count reaches one (1), this indicates that two frames in series are unrecorded, then, the flow chart logic proceeds to step S330. Finally, at step S330, the film is moved back by two frames to set the first unrecorded frame to the camera exposure aperture so that another exposure is made ready. Thereafter, the flow chart logic is terminated.

From the above description, it is shown that, by using the information about the number of unexposed frames previously recorded, this camera 1 shortens the time for setting the leading frame of unexposed portion of the film to the camera exposure aperture as compared with the camera 1 of the previous embodiment which usually has to detect two unrecorded frames in series and to move back the film by two frames in order to set the foremost frame of unexposed portion to the camera exposure aperture, although the same situation which requires to detect two consecutive unrecorded frames to set the right frame to the camera exposure aperture will arise in this camera 1 of the embodiment in the case that ID No. display mode is not executed when the film cartridge is loaded or a wrong ID No. is selected.

The camera 1 may be modified so as to store the number of exposed film frames in place of an ID No. of a film cartridge and the number of unexposed film frames of the film in EEPROM 24. That is, the number of unexposed frames in this camera is calculated by subtracting the number of exposed film frames from the number of all available film frames of a fresh film.

The camera may be further modified so that, if DEP determination concludes the status of a film in the film cartridge loaded in is PARTIAL while the first frame of the film is found that the magnetic track is not recorded, the flow chart logic of the film cartridge loading and film frame setting sequence routine is terminated without setting any frame for exposure. In this case it is recommended that the white flag for the VEI system is parked at the cross-shaped window, this indicates that the film has been exposed or processed, and a message that advises the user that all of the frames of the loaded film are already exposed or processed, or otherwise just simply not available, is displayed on the LCD display 18 or is sounded by using well known synthetic voice technology before the termination of the flow chart logic.

As described in detail, when advancing a film which is partly exposed and intentionally rewound midway in the interior of the cartridge loaded in the camera, no information is read nor recorded on magnetic tracks of consecutive two exposed film frames. The film is advanced until a first film frame of an unexposed portion of the film is placed at the camera exposure aperture. Because of that, even when there is only a single exposed film frame of which the information on the magnetic track is not read or of which the magnetic track is not recorded with information for some reasons, the frame is prevented from double exposure. Furthermore, when a film partly exposed and partly unexposed is intentionally rewound into the film cartridge reloaded in the camera, it is examined that the number of unexposed film frames and the number of exposed film frames of which the magnetic tracks are not recorded are consistent with each other, and the film is transported according to the number of the exposed film frame. Accordingly, placing the first unexposed film frame at the camera exposure aperture is reliably and quickly achieved. In addition, in cases where a film partly exposed and partly unexposed and intentionally rewound into a film cartridge which is reloaded in the camera is advanced, even when wrong selection of the ID No. and the number of exposed film frames occurs, the film is advanced according to information on the number of exposed film frames of which the magnetic tracks has not been recorded, so as to place the first unexposed film frame at the camera exposure aperture, and hence to prevent the exposed film frame from double exposure. While the photographic camera 1 is described as the type having a manual ID No. entry system, the camera may of course be provided with an automatic ID No. entry system.

Although the present invention has been described in detail regarding preferred embodiments thereof, various other embodiments and variants may be effected by those skilled in the art without departing from the scope of the invention.

What is claimed is:

1. A photographic camera for use with film having a row of film frames, each said frame being accompanied with a magnetic recording area, said photographic camera comprising:

film transportation means for transporting film loaded in the photographic camera frame by frame;

reading means for reading information recorded on the magnetic recording areas of exposed film frames as said film is transported frame by frame; and a controller for examining at least two of said magnetic recording areas of said film frames unrecorded with said information, and causing said film transportation means to transport said film until a foremost one of said film frames accompanied with said at least two of said unrecorded magnetic recording areas is placed in a specified position in the photographic camera.

2. A photographic camera for use with a film cartridge having an identification number applied thereto and which contains film, the film having a row of film frames, each said film frame being accompanied with a magnetic recording area, said photographic camera comprising:

a memory for storing information corresponding to an identification number of a film cartridge loaded in the photographic camera and information corresponding to one of a number of unexposed film frames and exposed film frames of film in said film cartridge;

film transportation means for transporting said film;

reading means for reading said magnetic recording area of each said film frame to detect information regarding exposure of each said film frame which is recorded as said film is transported frame by frame; and a controller for detecting a number of said film frames of which said magnetic recording areas read by said reading means are unrecorded with said information, respectively, examining coincidence of said number of said unexposed film frames stored in said memory with said number of said film frames accompanied with said unrecorded magnetic recording areas, respectively, and causing said film transportation means to transport said film by a length according to one of said numbers of said exposed film frames and said unexposed film frames when said coincidence is determined.

3. A photographic camera as defined in claim 1, wherein said controller further examines an exposed state of said film, and interrupts said film transportation means from transporting said film when detecting that said film is partly exposed and that said magnetic recording area of a foremost one of said film frames is unrecorded.

4. A photographic camera as defined in claim 2, wherein said controller further examines at least two of said unrecorded magnetic recording areas of said film frames when said coincidence is not determined, and causing said film transportation means to transport said film until a foremost one of said film frames whose said unrecorded magnetic recording areas are adjacent is placed in a specified position in the photographic camera when said continuance is determined.

5. A photographic camera as defined in claim 2, wherein said controller further examines an exposed state of said film, and interrupts said film transportation means from transporting said film when detecting that said film is partly exposed and that said magnetic recording area of a foremost one of said film frames is unrecorded.

6. A photographic camera as defined in claim 3, wherein said display means displays an indication that said film is fully exposed whenever said controller detects that said film is partly exposed and that said magnetic recording area of a foremost one of said frames is unrecorded.

7. A photographic camera as defined in claim 4, wherein said controller further examines an exposed state of said film, and interrupts said film transportation means from transporting said film when detecting that said film is partly exposed and that said magnetic recording area of a foremost one of said film frames is unrecorded.

* * * * *